United States Patent
Duan et al.

(10) Patent No.: US 9,042,068 B2
(45) Date of Patent: May 26, 2015

(54) PROTECTION CIRCUIT AND PROTECTION METHOD THEREOF

(75) Inventors: Xiao-Ming Duan, Hsinchu County (TW); Ronald Chang, Hsinchu County (TW)

(73) Assignee: HANERGY TECHNOLOGIES, INC., Hsinchu County (TW)

( * ) Notice: Subject to any disclaimer, the term of this patent is extended or adjusted under 35 U.S.C. 154(b) by 514 days.

(21) Appl. No.: 13/331,430

(22) Filed: Dec. 20, 2011

(65) Prior Publication Data

US 2012/0162841 A1 Jun. 28, 2012

(30) Foreign Application Priority Data

Dec. 24, 2010 (TW) ................. 99145953 A

(51) Int. Cl.
  H02H 3/08 (2006.01)
  H02H 9/02 (2006.01)
  H02H 9/08 (2006.01)
  H02H 3/00 (2006.01)
  H02H 3/093 (2006.01)
  H02H 3/02 (2006.01)

(52) U.S. Cl.
  CPC ............. *H02H 3/093* (2013.01); *H02H 3/025* (2013.01)

(58) Field of Classification Search
  USPC ............... 361/93.1, 93.9, 87, 94–97
  See application file for complete search history.

(56) References Cited

U.S. PATENT DOCUMENTS

| 4,791,522 | A * | 12/1988 | Bergh ................. 361/98 |
| 5,216,352 | A * | 6/1993 | Studtmann et al. ........... 323/241 |
| 5,375,029 | A * | 12/1994 | Fukunaga et al. ........... 361/101 |
| 5,656,931 | A * | 8/1997 | Lau et al. ................ 324/522 |
| 6,320,275 | B1 * | 11/2001 | Okamoto et al. ............ 307/10.1 |
| 6,515,840 | B2 * | 2/2003 | Covi et al. ................. 361/93.1 |
| 6,831,821 | B2 * | 12/2004 | Ohshima ........................ 361/86 |
| 7,079,368 | B2 * | 7/2006 | Ishikawa et al. ............. 361/93.1 |
| 7,265,959 | B2 * | 9/2007 | Guo ........................... 361/93.1 |
| 7,369,385 | B2 * | 5/2008 | Brennan et al. ............. 361/93.1 |
| 7,813,096 | B2 * | 10/2010 | Takahashi et al. ........... 361/93.1 |
| 7,898,784 | B2 * | 3/2011 | Chang ........................ 361/93.9 |
| 8,315,027 | B2 * | 11/2012 | Sugimoto et al. ............ 361/93.1 |
| 8,488,289 | B2 * | 7/2013 | Thiery ....................... 361/93.9 |
| 2002/0080544 | A1 * | 6/2002 | Pellegrino .................. 361/93.9 |
| 2005/0135037 | A1 * | 6/2005 | Thiery et al. ................. 361/94 |
| 2006/0164773 | A1 * | 7/2006 | Stanford et al. ............. 361/93.1 |
| 2008/0062603 | A1 * | 3/2008 | Richter ...................... 361/93.1 |
| 2008/0074820 | A1 * | 3/2008 | Thiery ....................... 361/93.7 |
| 2009/0051393 | A1 * | 2/2009 | Kamenicky et al. .......... 327/108 |
| 2010/0134939 | A1 * | 6/2010 | Takahashi et al. ............. 361/87 |

\* cited by examiner

*Primary Examiner* — Thienvu Tran
*Assistant Examiner* — Christopher Clark
(74) *Attorney, Agent, or Firm* — The PL Law Group, PLLC

(57) ABSTRACT

The present invention provides a protection circuit. The protection circuit includes an output stage circuit and a feedback unit that generates a first current. Under a first condition that the first current is one of currents larger than and equal to a rated current and the first condition remains for a first period, the feedback unit controls the output stage circuit to restrict the first current. Under a second condition that the first current is one of currents larger than and equal to a restriction current and the second condition remains for a second period, the feedback unit controls the output stage circuit to terminate the first current.

20 Claims, 12 Drawing Sheets

PROTECTION CIRCUIT AND PROTECTION METHOD THEREOF

CROSS REFERENCE TO RELATED APPLICATION AND CLAIM OF PRIORITY

The present invention claims the benefits of priority from the Taiwanese Patent Application No. 099145953, filed on Dec. 24, 2010, the contents of the specification of which are hereby incorporated herein by reference. The present invention relates to a protection circuit, particularly a short-circuit protection circuit or an over-current protection circuit.

BACKGROUND OF THE INVENTION

1. Filed of the Invention

The present invention is related to a protection circuit and a method of operating a protection circuit.

2. Related Art

There are usually two types of short-circuit or over-current protection circuit: the one uses current-restricting circuit for protection and the other detects the temperature of the components for selecting protection scheme. The latter cannot achieve effective protection when the temperature surges so rapidly that the protecting scheme is not timely activated and the components are burnt without protection. Traditional methods of using current-restricting for protection may cause restriction to normal current pulses and end up with malfunctions.

Please refer to FIG. 1A, which is a schematic diagram illustrating a unit gain amplifier circuit known to the art. The unit gain amplifier circuit 10 includes a unit gain amplifier 11, a signal source 12 and a loading circuit 13. The signal source 12 generates a voltage Vin1 which is transmitted to the positive input terminal in1+. The output terminal out1 of the unit gain amplifier 11 is coupled to the negative input terminal in1− thereof and the loading circuit 13. An output current Iout1 and an output voltage Vout1 are outputted from the output terminal out1.

Refer to FIG. 1B, which is a schematic diagram of the wave form of the outputs of the unit gain amplifier circuit 10. It is observed that an upward pulse PL1 with a duration T1 and a downward pulse PL2 with a duration T2 occur in the output current Iout1 and the output voltage Vout1 respectively. Furthermore, it is also observed that a downward pulse PL3 with a duration T3 and an upward pulse PL4 with a duration T4 occur in the output current Iout1 and the output voltage Vout1 respectively.

If the durations T1, T2, T3 and T4 are short periods of time, those pulses will damage neither the unit gain amplifier 10 nor the loading circuit 13. Therefore, malfunctions may occur to the unit gain amplifier 10 known as prior art, if a traditional current restriction circuit is employed for the use of restricting currents.

Refer to FIG. 1C, which is a schematic diagram of a switching power circuit 20 known to the art. The switching power circuit 20 includes a signal source 21, an inductor L1, a loading circuit 22, a transistor X1, a diode D1 and a PWM controller 23, and generates output current Iout2 and output voltage Vout2, according to FIG. 1C. Similarly, pulses may occur in the output voltage Vout2 or the output current Iout2. If the durations of the pulses are short periods of time, no damage will occur to switching power circuit 20 or to the loading circuit 22.

Refer to FIG. 1D, which is a schematic diagram of an output stage circuit 31 known to the art. The output stage circuit 31 is coupled to a loading circuit 32 and generates an output current Iout3 and an output voltage Vout3. Compared with the circuits illustrated in FIGS. 1A and 1C, one may observe that the output stage circuit 31 may be considered as either the combination of the unit gain amplifier 11 and the signal source 12 or that of the signal source 21, the inductor L1, the loading circuit 22, the transistor X1, the diode D1 and the PWM controller 23. Any component in the output stage circuit 31 and the loading circuit 32 may be burnt down if the durations of pulses existing in either the output current Iout3 or the output voltage Vout3 are too long. On the contrary, malfunctions may occur if the durations of the pulses are very short and a traditional current restriction circuit is employed.

According to the above-mentioned, there is a need to develop a new protection circuit and protection method to avoid malfunctions when the circuit is under a normal operational condition and to restrict or shut-off the current to prevent the components from being damaged when the circuit is under an abnormal condition.

SUMMARY

It is an objective of the present invention to provide a protection circuit and a method thereof. To achieve the above-mentioned objective, the present invention provides a protection circuit. The protection circuit includes an output stage circuit and a feedback unit that generates a first current. Under a first condition that the first current is one of currents larger than and equal to a rated current and the first condition remains for a first period, the feedback unit controls the output stage circuit to restrict the first current. Under a second condition that the first current is one of currents larger than and equal to a restriction current and the second condition remains for a second period, the feedback unit controls the output stage circuit to terminate the first current.

In accordance with another aspect of the present invention, a protection circuit having an electrical parameter is provided. The protection circuit includes a control unit. The control unit provides a first control and a second control to the electrical parameter in response to a first condition and a second condition of the electrical parameter, respectively.

In accordance with a further aspect of the present invention, a method of operating a protection circuit is provided. The method includes steps of: (a) outputting a second voltage based on a first voltage controlling a first current; (b) outputting a first signal when the second voltage is larger than a reference voltage, wherein the first signal has a working period; (c) outputting a second signal to restrict the first current when the working period is one of periods longer than and equal to a first period; and (d) outputting a third signal to terminate the first current when the working period is one of periods longer than and equal to a second period.

In accordance with a further aspect of the present invention, a method of operating a protection circuit is provided. The method includes steps of: (a) detecting an electrical parameter of the circuit, wherein the electrical parameter has a first and a second conditions; (b) detecting the electrical parameter to determine which one of the first condition and the second condition the electrical parameter is situated in; (c) implementing a first restriction to the electrical parameter in the first condition; and (d) implementing a second restriction to the electrical parameter in the second condition.

The above objects and advantages of the present invention will be more readily apparent to those ordinarily skilled in the art after reading the details set forth in the descriptions and drawings that follow, in which:

DETAILED DESCRIPTION OF EXEMPLARY EMBODIMENTS

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
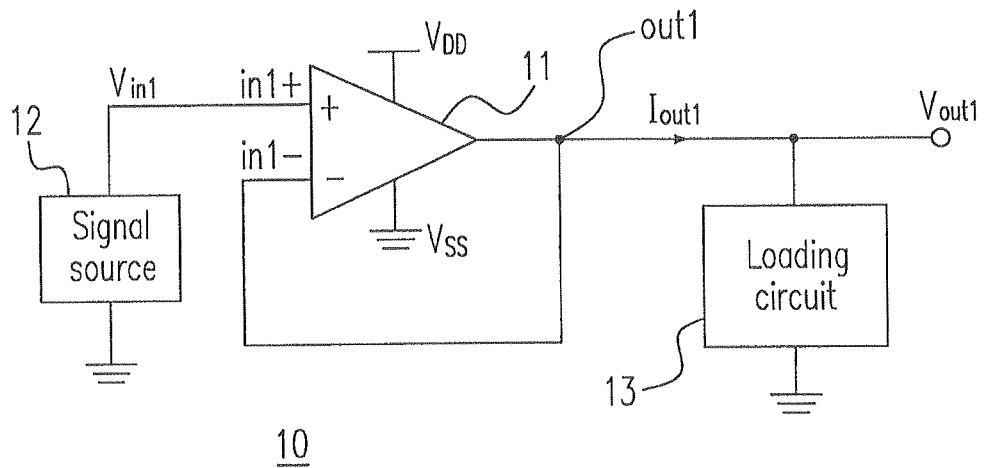
FIG. 1A is a schematic diagram illustrating a unit gain amplifier circuit according to the prior art.
Figure 1B:
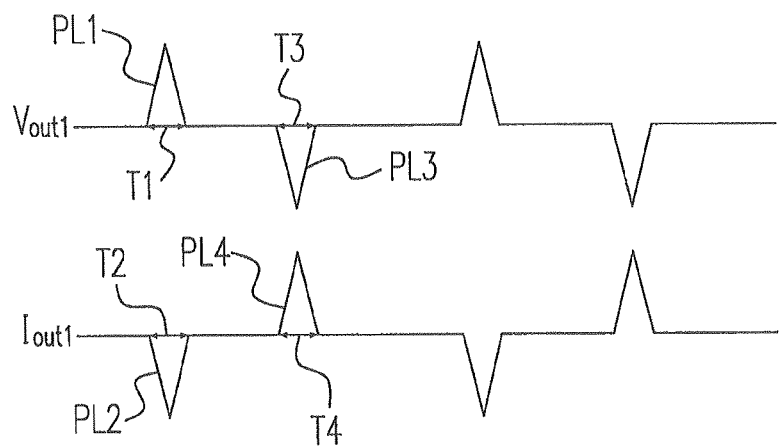
FIG. 1B is a schematic diagram of the wave form of the outputs of the unit gain amplifier circuit 10 shown in FIG. 1.
Figure 1C:
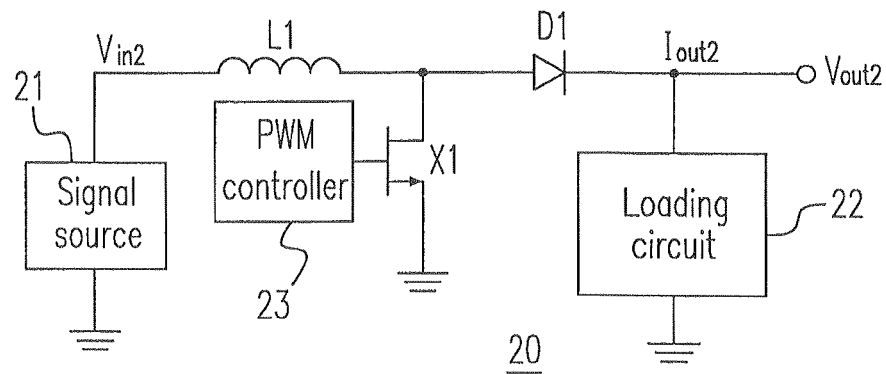
FIG. 1C is a schematic diagram illustrating a switching power circuit according to the prior art.
Figure 1D:
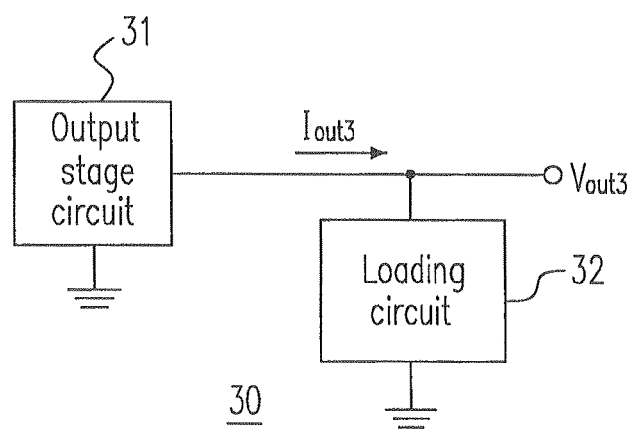
FIG. 1D is a schematic diagram illustrating an output stage circuit according to the prior art.
Figure 2A:
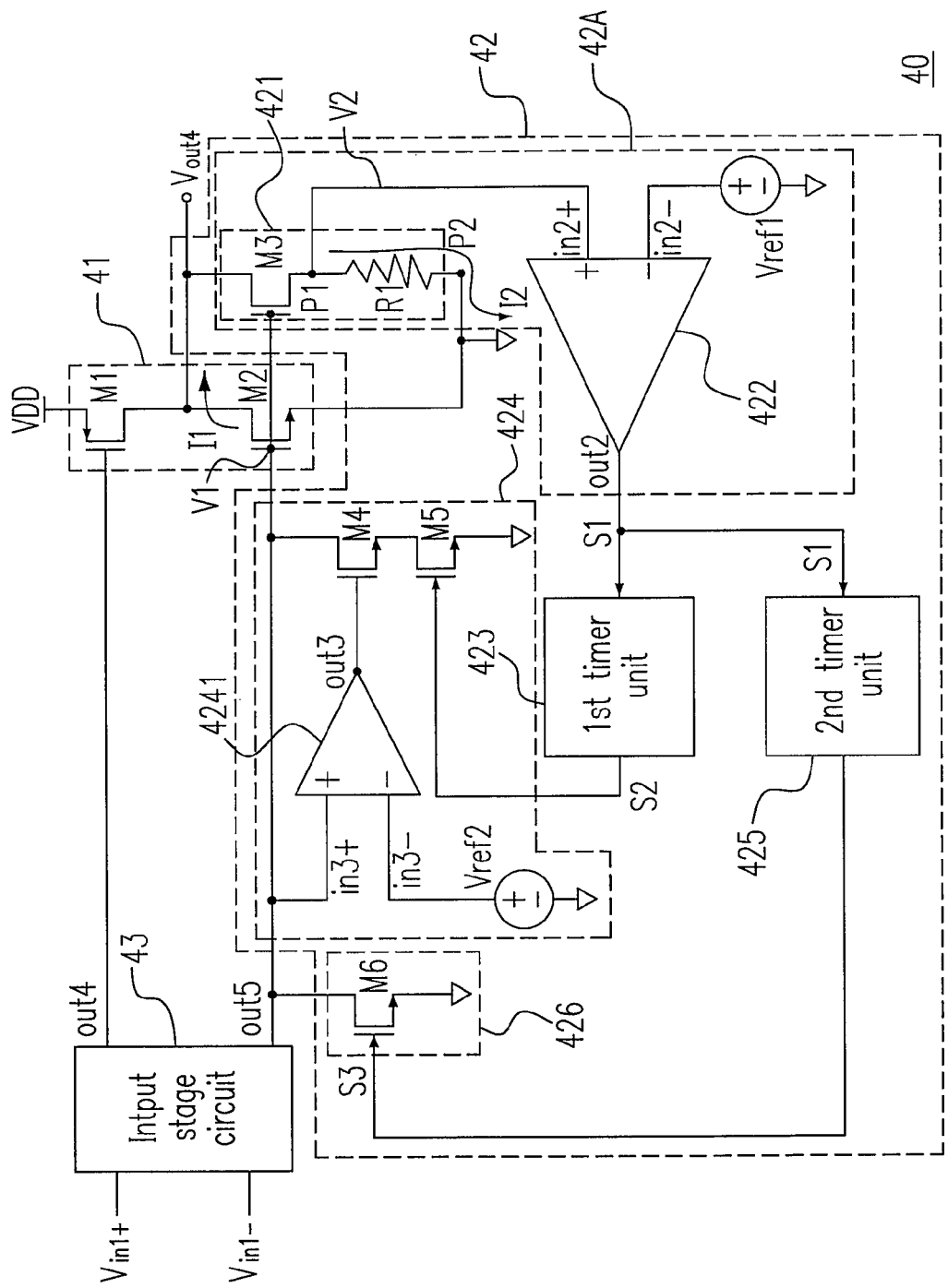
FIG. 2A is a schematic diagram showing a protection circuit in accordance with one embodiment of the present invention.
Figure 2B:
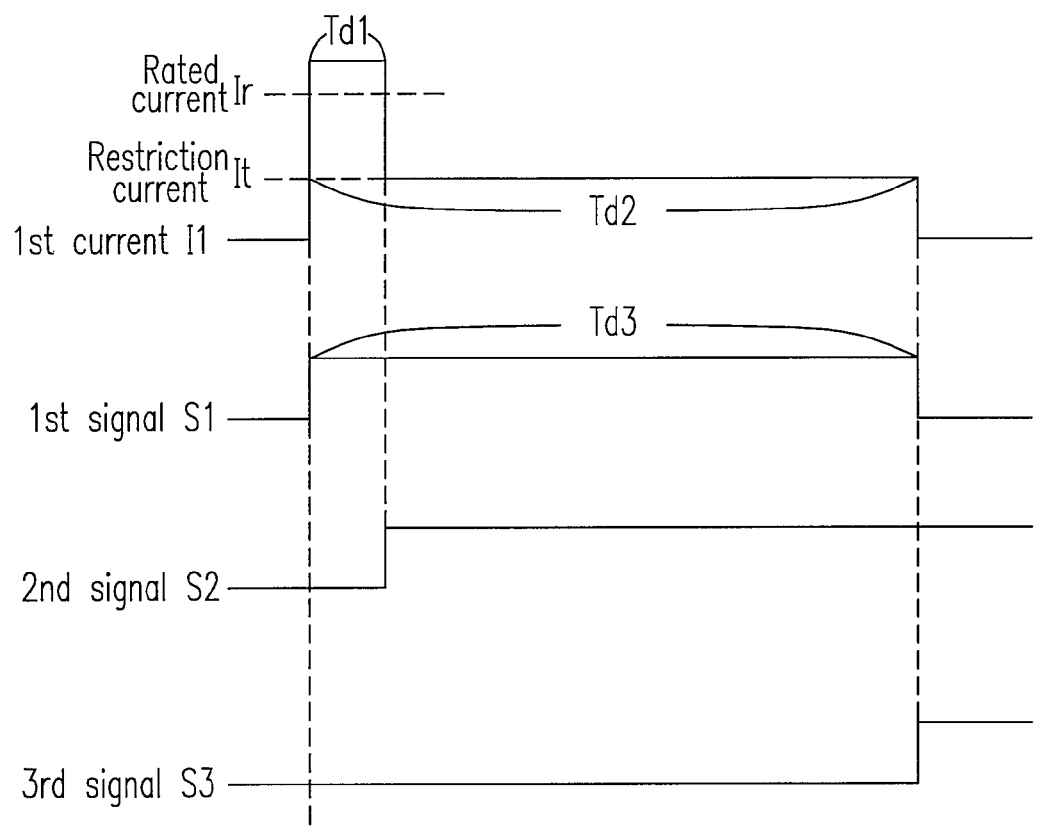
FIG. 2B is the waveform diagram of signals according to the embodiment of the protection circuit illustrated in FIG. 2A.

Please refer to FIG. 2A, which is a schematic diagram showing a protection circuit in accordance with one embodiment of the present invention. According to FIG. 2A, the protection circuit 40 includes an output stage circuit 41 and a feedback unit 42. FIG. 2B shows the waveform diagram of signals in the embodiment of the protection circuit 40 of FIG. 2A. In the illustrations of FIG. 2B, the horizontal axis indicates time with a unit of micro second, while the longitudinal axis of the first current I1 indicates current with a unit of amp and that of the others indicate voltage with a unit of volt. The first current I1 is generated by the output stage circuit 41. Under a first condition that the first current I1 is larger than or equal to a rated current Ir and the first condition remains for a first period Td1, the feedback unit 42 controls the output stage circuit 41 to restrict the first current I1. Under a second condition that the first current I1 is larger than or equal to a restriction current It and the second condition remains for a second period Td2, the feedback unit 42 controls the output stage circuit 41 to terminate the first current I1. According to FIG. 2B, it can be observed that the second period Td2 is longer than the first period Td1, while the restriction current It is lower than the rated current Ir. According to a preferred embodiment, the rated current Ir, the restriction current It, the first period Td1 and the second period Td2 are 10 amp, 1 amp, 100 microsecond and 3 millisecond, respectively.

Referring to FIG. 2A, the output stage circuit 41 comprises a first N-type transistor M2 and a first P-type transistor M1, the first N-type transistor M2 has a drain coupled to that of the first P-type transistor M1, and the first N-type transistor M2 has a gate receiving a first voltage V1 to adjust the first current I1 outputted from the drain of the first N-type transistor M2.

The feedback unit includes a current measurement unit 421, an operational amplifying unit 422, a first timer unit 423, a restriction unit 424, a second timer unit 425 and a termination unit 426. The current measurement unit 421 includes a second N-type transistor M3 and a resistor R1. The second N-type transistor M3 has a drain coupled to that of the first N-type transistor M2, and has a gate receiving the first voltage V1. The current measurement unit 421 outputs a second voltage V2 in response to the first voltage V1.

The operational amplifying unit 422 includes a first input terminal in2+, a second input terminal in2−, and a first output terminal out2. The first and the second output terminals in2+, in2− receive the second voltage V2 and a first reference voltage Vref1, respectively. The operational amplifying unit 422 outputs a first signal S1 from the first output terminal out2 in response to the second voltage V2 and the first reference voltage Vref1, wherein the first signal S1 includes a difference signal obtained by subtracting the first reference voltage Vref1 from the second voltage V2. The first signal S1 is a positive saturation signal when the difference signal is positive, while the first signal S1 is a negative saturation signal when the difference signal is negative.

In one aspect, the feedback unit 42 has a measurement unit 42A comprising the current measurement unit 421 and the operational amplifying unit 422, according to the illustrations of FIG. 2A.

Again, referring to FIG. 2A, the protection circuit 40 also performs restrictions or termination to a voltage Vout4 by neglecting the second N-type transistor M3 and the resistor R1 while connecting the drain of the first N-type transistor M2 with the first input in2+.

The first timer unit 423 receives the first signal S1, which has a working period Td3, and transmits a second signal S2 when the working period Td3 is longer than or equal to the first period Td2. FIG. 2B schematics the condition that the first period Td2 equals to the working period Td3.

The restriction unit 424 includes an amplifier 4241, a third N-type transistor M4 and a fourth N-type transistor M5, and restricts the first current I1 by reducing the first voltage V1 in response to the second signal S2.

The second timer unit 425 receives the first signal S1, and transmits a third signal S3 when the working period Td3 is longer than or equal to the second period Td2.

The termination unit 426 includes a fifth N-type transistor M6 having a gate coupled to the output terminal of the second timer unit 425 to receive the third signal S3. The termination unit 426 terminates the first current I1 to protect the first N-type transistor M2 in response to the third signal S3 by reducing the first voltage V1.

The resistor R1 has a first terminal P1 coupled to the drain of the second N-type transistor M3 and a second terminal P2 coupled to a ground. The second N-type transistor M3 has a source outputting a second current I2 which flows through the resistor R1 so as to cause the resistor R1 to have a voltage drop being equal to the second voltage V2.

The amplifier 4241 has a positive input terminal in3+, a negative input terminal in3− and a second output terminal out3. The third N-type transistor M4 has a drain coupled to the positive input terminal and a gate coupled to the second output terminal out3. The negative input terminal in3− receives a second reference voltage Vref2.

The protection circuit 40 further comprises an input stage circuit 43 having a third output terminal out4 and a fourth output terminal out5. The third output terminal out4 is coupled to the gate of the first P-type transistor M1, and the fourth output terminal out5 is coupled to the drain of the fifth P-type transistor M6, the positive input terminal in3+, the drain of the third P-type transistor M4, and the gate of the first N-type transistor M2.

In the circuit of the restriction unit 424, the source of the third N-type transistor M4 is coupled to the drain of the fourth N-type transistor M5, and the gate of the fourth N-type transistor M5 is coupled to the output terminal of the first timer unit 423 to receive the second signal S2. When the fourth N-type transistor M5 is open, the amplifier 4241 and the third N-type transistor M4 will not produce a function to clamp the first voltage V1. When the fourth N-type transistor M5 is conductive and the first voltage V1 is higher than the second reference voltage Vref2, the third N-type transistor M4 is conductive, which lowers the first voltage V1 to render the voltage of the first voltage V1 close to that of the second reference voltage Vref2. The third N-type transistor M4 will then remain under a status of slightly conductive, so the restriction unit 424 is able to restrict the first current I1 by lowering the first voltage V1.

Figure 3A:
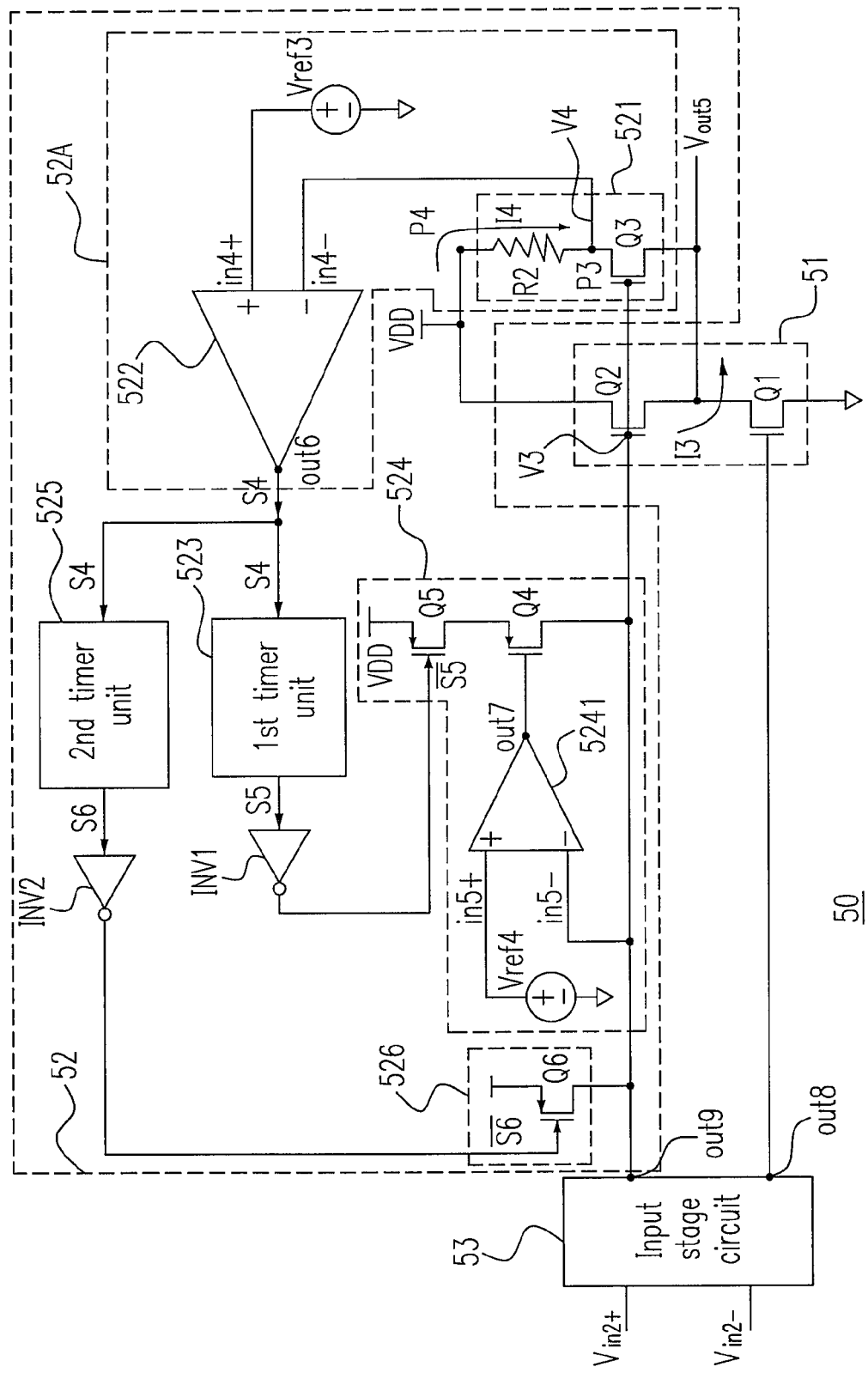
FIG. 3A is a schematic diagram showing a protection circuit in accordance with another embodiment of the present invention.
Figure 3B:
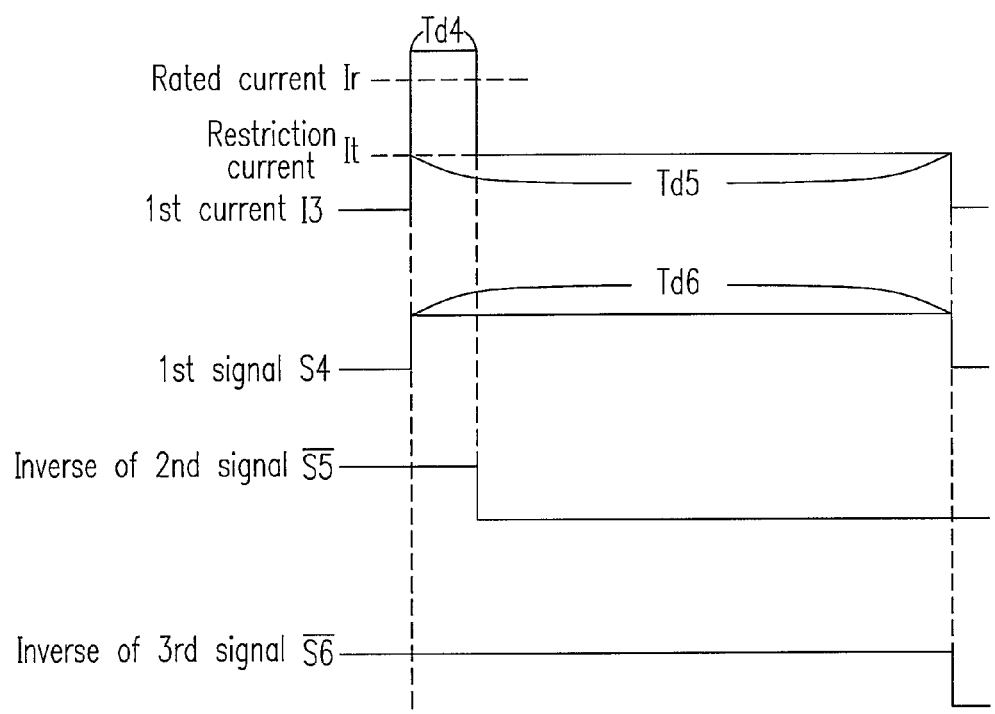
FIG. 3B is the waveform diagram of signals according to the embodiment of the protection circuit illustrated in FIG. 3A.

Please refer to FIG. 3A, which is a schematic diagram showing a protection circuit in accordance with another embodiment of the present invention. According to FIG. 3A, the protection circuit 50 includes an output stage circuit 51 and a feedback unit 52. FIG. 3B shows the waveform diagram of signals in the embodiment of the protection circuit 50 of FIG. 3A. In the illustrations of FIG. 3B, the horizontal axis indicates time with a unit of micro second, while the longitudinal axis of the first current I3 indicates current with a unit of amp and that of the others indicate voltage with a unit of volt. The first current I3 is generated by the output stage circuit 51. Under a first condition that the first current I3 is larger than or equal to a rated current Ir and the first condition remains for a first period Td4, the feedback unit 52 controls the output stage circuit 51 to restrict the first current I3. Under a second condition that the first current I3 is larger than or equal to a restriction current It and the second condition remains for a second period Td5, the feedback unit 52 controls the output stage circuit 51 to terminate the first current I3. According to FIG. 3B, it is observed that the second period Td5 is longer than the first period Td4, while the restriction current It is lower than the rated current Ir. According to a preferred embodiment, the rated current Ir, the restriction current It, the first period Td4 and the second period Td5 are 10 amp, 1 amp, 100 microsecond and 3 millisecond, respectively.

Referring to FIG. 3A, the output stage circuit 51 comprises a first N-type transistor Q1 and a first P-type transistor Q2, the first N-type transistor Q1 has a drain coupled to that of the first P-type transistor Q2, and the first N-type transistor Q1 has a gate receiving a first voltage V3 to adjust the first current I3 outputted from the drain of the first P-type transistor Q2.

The feed back unit 52 comprises a current measurement unit 521, an operational amplifying unit 522, a first timer unit 523, a first inverter INV1, a restriction unit 524, a second timer unit 525, a second inverter INV2 and a termination unit 526.

The current measurement unit 521 includes a second P-type transistor Q3 and a resistor R2. The second P-type transistor Q3 has a drain coupled to that of the first P-type transistor Q2, and has a gate receiving the first voltage V3. The current measurement unit 521 outputs a second voltage V4 in response to the first voltage V3.

The operational amplifying unit 522 includes a first input terminal in4+, a second input terminal in4− and a first output terminal out6. The first and the second input terminals in4+, in4− receive the second voltage V4 and a first reference voltage Vref3 respectively. The operational amplifying unit 522 outputs a first signal S4 from the first output terminal out6 in response to the second voltage V4 and the first reference voltage Vref3. The first signal S4 includes a difference signal obtained by subtracting the second voltage V4 from the first reference voltage Vref3. The first signal S4 is a positive saturation signal when the difference signal is positive, and is a negative saturation signal when the difference signal is negative. The feedback unit 52 further includes a measurement unit 52A, which comprises the current measurement unit 521 and the operational amplifying unit 522.

Again, referring to FIG. 3A, the protection circuit 50 also performs restrictions or termination to a voltage Vout5 by neglecting the second P-type transistor Q3 and the resistor R2 while connecting the drain of the first P-type transistor Q2 with the first input in4+.

The first timer unit 523 receives the first signal S4 having a working period Td6, and transmits a second signal S5 when the working period Td6 is longer than or equal to the first period Td4.

The first inverter INV1 generates an inverse signal $\overline{S5}$ of the second signal S5 in response to the second signal S5. The restriction unit 524 includes an amplifier 5241, a third P-type transistor Q4 and a fourth P-type transistor Q5, and restricts the first current I3 in response to the inverse signal $\overline{S5}$ of the second signal S5 by increasing the first voltage I3.

The second timer unit 525 receives the first signal S4, and transmits a third signal S6 when the working period Td6 is longer than or equal to a second period Td5. The second inverter INV2 generates an inverse signal $\overline{S6}$ of the third signal S6 in response to the third signal S6. The termination unit 526 includes a fifth P-type transistor Q6, and terminates the first current I3 to protect the first P-type transistor Q2 in response to the third signal S6 by increasing the first voltage V3.

According to the illustrations in FIG. 3A, the resistor R2 has a first terminal P3 coupled to the source of the second P-type transistor Q3 and a second terminal P4 coupled to a power source. The source of the second P-type transistor Q3 outputs a second current I4 which flows through the resistor R2 so as to cause the second voltage V4 being equal to the voltage drop of R2 subtracted from the voltage VDD of the power source.

The amplifier 5241 has a positive input terminal in5+, a negative input terminal in5− and a second output terminal out7. The third P-type transistor Q4 has a drain coupled to the negative input terminal in5−, and has a gate coupled to the second output terminal out7. The positive input terminal in5+ receives a second reference voltage Vref4.

The protection circuit 50 further comprises an input stage circuit 53 having a third output terminal out8 and a fourth output terminal out9 and receiving voltages Vin2+ and Vin2−. The third output terminal out8 is coupled to the gate of the first N-type transistor Q1, and the fourth output terminal out9 is coupled to the drain of the fifth P-type transistor Q6, the negative input terminal in5−, the drain of the third P-type transistor Q4, and the gate of the first N-type transistor Q2.

In the circuit of the restriction unit 524, the source of the third N-type transistor Q4 is coupled to the drain of the fourth N-type transistor Q5, and the gate of the fourth N-type transistor Q5 is coupled to the output terminal of the first inverter INV1 to receive an inverse signal S5 of the second signal S2. When the fourth N-type transistor Q5 is open, the amplifier 5241 and the third N-type transistor Q4 will not produce a function to clamp the first voltage V3. When the fourth N-type transistor Q5 is conductive and the first voltage V3 is lower than the second reference voltage Vref4, the third N-type transistor Q4 is conductive, so the voltage of the first voltage V3 rises and approaches to that of the second reference voltage Vref4. The third N-type transistor Q4 will then remain under a status of slightly conductive, so the restriction unit 524 is able to restrict the first current I3 by increasing the value of the first voltage V3.

Figure 3C:
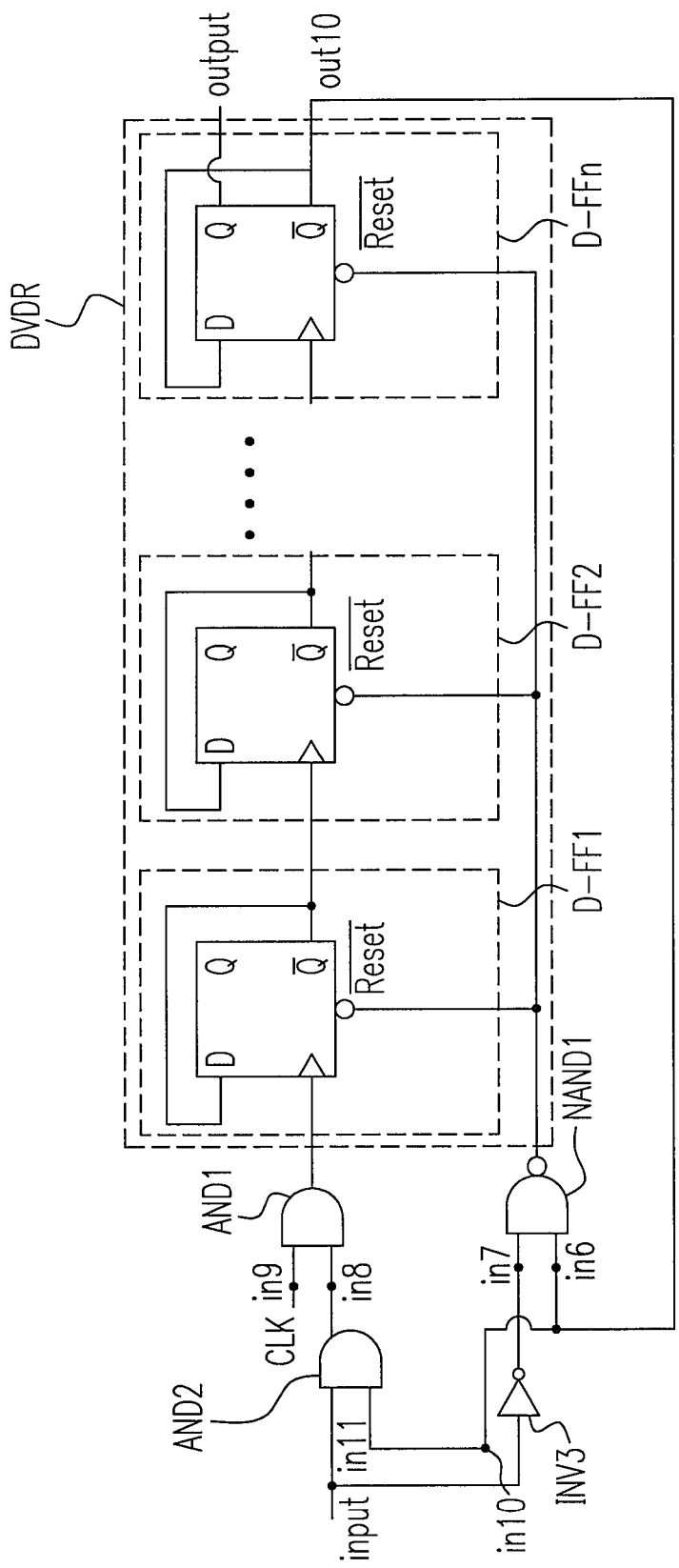
FIG. 3C is a schematic diagram showing the circuit the timer units according to the present invention.

Please refer to FIG. 3C, which schematics the circuit diagram of the first timer unit 423, 523 or the second timer unit 425, 525 of the present invention. The timer unit 423, 523, 425 or 525 comprises a divider DVDR, a NAND gate NAND1, AND gates AND1, AND2 and an inverter INV3. According to the illustrations of FIG. 3C, the divider DVDR includes a number of N of D-type flip-flops, namely a first D-type flip-flop D-FF1, a second D-type flip-flop D-FF2 . . . and an Nth D-type flip-flop D-FFn in a series. For each of the D-type flip-flop, the output terminal $\overline{Q}$ is coupled to the input terminal D thereof and the pulse input of another D-type flip-flop. The reset terminal of each D-type flip-flop is coupled to the output terminal of the NAND gate NAND 1. An input terminal in11 of the AND gate AND2 and the inverter INV3 receive a signal input including the first signal S1 or S4. An input terminal in9 of the AND1 receives a clock signal CLK.

Figure 3D:
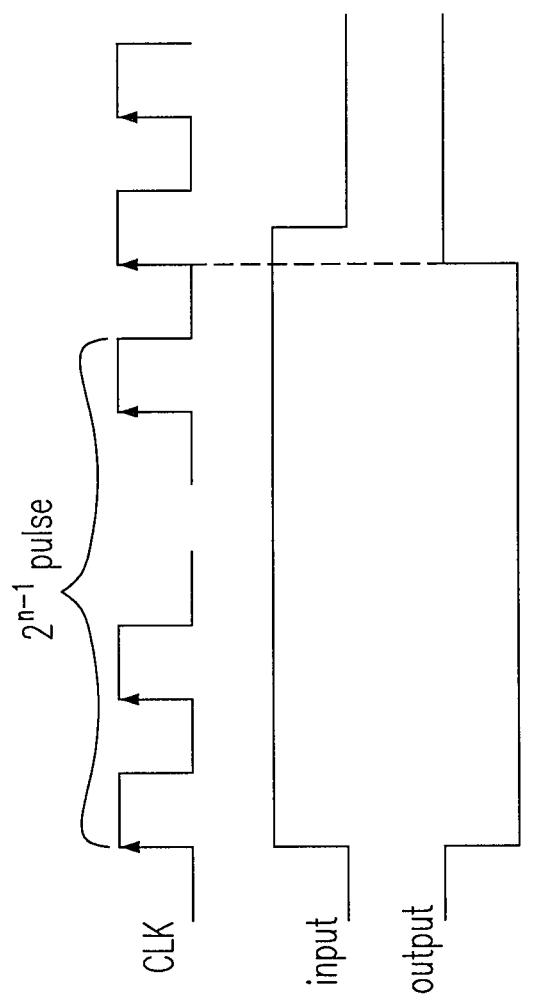
FIG. 3D schematics the waveforms of the signals in the embodiments of timer unit illustrated in FIG. 3C.

Refer to FIG. 3D, which schematics the waveforms of the signals denoted as CLK, input and output in the embodiments of timer unit illustrated in FIG. 3C, wherein the longitudinal axis indicates voltage and the horizontal axis does time. It is appreciated by the skilled person in the art that the signal output is switched from logic 0 (low signal level) to logic 1 (high signal level) so as to avoid a malfunction of the protection circuit 40, 50 illustrated in FIGS. 2A and 3A when the signal input lasts for a period which is equal to or longer than a number of $2^{(n-1)}$ times of the pulse period of the clock signal CLK. When both the signal input and the signal output are at logic 0, each of the D-type flip-flops in the divider DVDR is reset to logic 0. When the signal input is changed from logic 0 to logic 1 and the signal output is at logic 0, the divider DVDR starts to operate. If the signal output is not changed to logic 1 while the signal input is changed from logic 1 to logic 0, each of the D-type flip-flops in the divider DVDR is reset to logic 0.

In the illustrations of FIGS. 2A and 3A, the total numbers of D-type flip-flops in the first timer units 423, 523 are designed to be less than that in the second timer units 425, 525 respectively, so the first timer units 423, 523 generate second signals S2, S5 being at logic 1 after receiving first signals S1, S4 for the first periods Td1, Td4, respectively, and the second timer units 425, 525 generate third signals S3, S6 being at logic 1 after receiving first signals S1, S4 for the second periods Td2, Td5, respectively. Noted that the first periods Td1, Td4 are shorter than the second periods Td2, Td5.

Figure 4A:
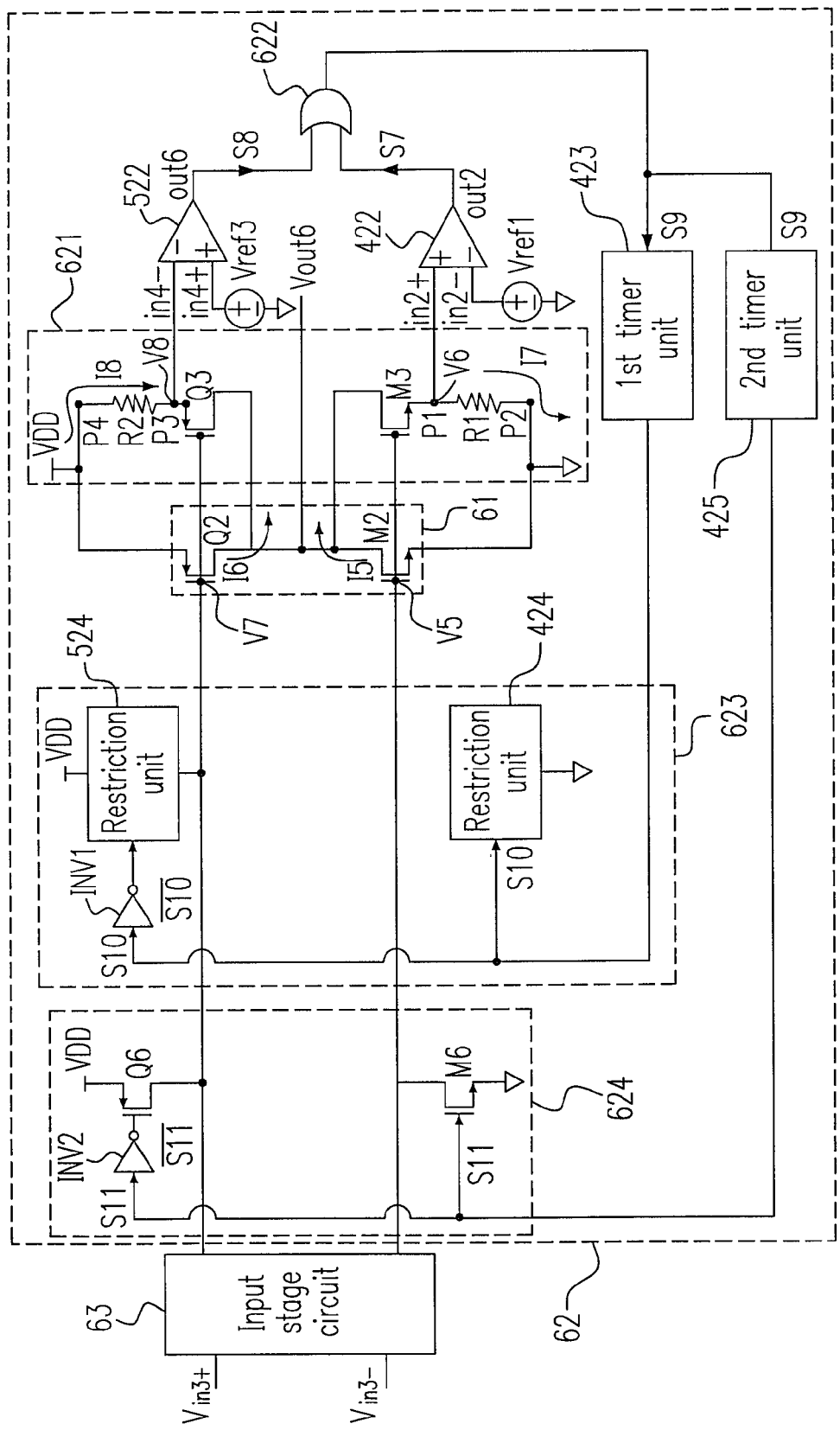
FIG. 4A is a schematic diagram showing a protection circuit in accordance with another embodiment of the present invention.

Please refer to FIG. 4A, which schematics a protection circuit according to another embodiment of the present invention. In prior embodiments set forth above, the gate voltages of the second N-type transistor M2 and that of the second P-type transistor Q2 of the output stage circuits are controlled so as to avoid that any element is burnt due to the first currents I1 and I3, respectively. According to the present embodiment, it is appreciated that the circuits as well as components in the prior embodiments are combined to avoid that the elements are burnt due to the first currents I1 and I3 simultaneously. The protection circuit 60 comprises a control unit 62 providing a first control and a second control to the electrical parameter in response to a first condition and a second condition of an electrical parameter, respectively. The electrical parameter may be first currents I1, I3, I5 and I6 or a voltage Vout6. It is appreciated by the skilled person in the art that the voltage Vout6 in FIG. 4A can be restricted or terminated if the second N-type transistor M3 and the resistor R1 is removed from the circuit while the drain of the first N-type transistor M2 is directly coupled to the first input terminal in2+.

Figure 4B:
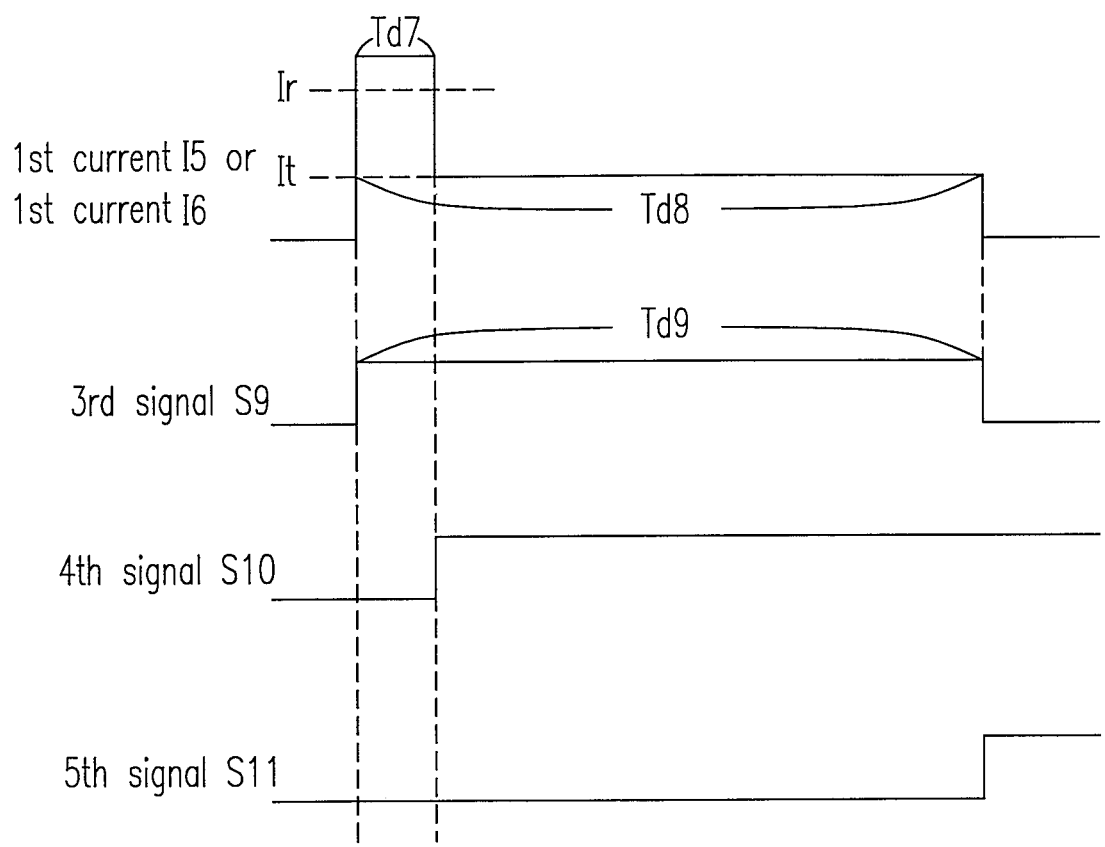
FIG. 4B is the waveform diagram of signals according to the embodiment of the protection circuit illustrated in FIG. 4A.

FIG. 4B shows the waveform diagram of signals in the embodiment of the protection circuit 60 of FIG. 4A. In the illustrations of FIG. 4B, the horizontal axis indicates time with a unit of micro second, while the longitudinal axis of the first currents I5, I6 indicates current with a unit of amp and that of the others indicate voltage with a unit of volt.

According to a preferred embodiment, the first control is a restriction while the second control is a shut-off. Furthermore, the first condition is a first status that the first current I1, I3, I5 or I6 is larger than or equal to a rated current Ir and the first status remains for a first period Td1, Td4 or Td7, and the second condition is a second status that the first current I1, I3, I5 or I6 is larger than or equal to a restriction current It and the second status remains for a second period Td2, Td5 or Td8. Notably, the second period Td2, Td5 or Td8 is longer than the first period Td1, Td4 or Td7, and the restriction current It is lower than the rated current Ir.

Referring to FIG. 4A, the protection circuit 60 further comprises an output stage circuit 61 which includes a first N-type transistor M2 and a first P-type transistor Q2. The first N-type transistor M2 has a drain coupled to that of the first P-type transistor Q2, and the first N-type transistor M2 has a gate receiving a first voltage V5 to adjust the first current I5 outputted from the drain of the first N-type transistor M2. The first P-type transistor Q2 has a gate receiving a second voltage V7 to adjust the second current I6 outputted from the drain of the first P-type transistor Q2.

The control unit 62 comprises a current measurement unit 621, a first operational amplifying unit 422, a second operational amplifying unit 522, an OR gate 622, a first timer unit 423, a restriction unit 623, a second timer unit 425 and a termination unit 624.

The current measurement unit 621 includes a second N-type transistor M3 and a resistor R2. The second N-type transistor M3 has a drain coupled to that of the first N-type transistor M2, and has a gate receiving the first voltage V5. The current measurement unit 621 outputs a third voltage V6 in response to the first voltage V5. The second P-type transistor Q3 has a drain coupled to that of the first P-type transistor Q2, and has a gate receiving the second voltage V7. The current measurement unit 621 outputs a fourth voltage V8 in response to the second voltage V7.

The first operational amplifying unit 422 includes a first input terminal in2+, a second input terminal in2− and a first output terminal out2. The first and the second input terminals in2+, in2− receive the third voltage V6 and a first reference voltage Vref1 respectively. The first operational amplifying unit 422 outputs a first signal S7 from the first output terminal out2 in response to the third voltage V6 and the first reference voltage Vref1. The first signal S7 includes a difference signal obtained by subtracting the first reference voltage Vref1 from the second voltage V6. The first signal S7 is a positive saturation signal when the difference signal is positive, and is a negative saturation signal when the difference signal is negative.

The second operational amplifying unit 522 includes a third input terminal in4+, a fourth input terminal in4− and a first output terminal out6. The third and the fourth input terminals in4+, in4− receive the fourth voltage V8 and a second reference voltage Vref3 respectively. The second operational amplifying unit 522 outputs a second signal S8 from the second output terminal out6 in response to the fourth voltage V8 and the second reference voltage Vref3. The second signal S8 includes a difference signal obtained by subtracting the fourth voltage V8 from second reference voltage Vref3. The first signal S8 is a positive saturation signal when the difference signal is positive, and is a negative saturation signal when the difference signal is negative. The OR gate 622 outputs a third signal S9 in response to the first signal S7 and the second signal S8.

The first timer unit 423 receives the third signal S9 having a working period Td9, and transmits a second signal S10 when the working period Td9 is longer than or equal to the first period Td7.

The restriction unit 623 includes restriction units 424, 524 and a first inverter INV1. It is appreciated that the detailed circuit layout and functions of the restriction units 424, 524 are set forth in previous paragraphs so there is no need to repeat. The restriction unit 623 restricts the first current I5 in response to the fourth signal S10 by reducing the first voltage V5, and restricts the second current I6 in response to the inverse signal S10 of the fourth signal S10 by increasing the second voltage V7.

The second timer unit 425 receives the third signal S9, and transmits a fifth signal S11 when the working period Td9 is longer than or equal to a second period Td8. The termination unit 624 includes a fifth N-type transistor M6, a fifth P-type transistor Q6 and a second inverter INV2, terminates the first current I5 to protect the first N-type transistor M2 in response to the fifth signal S11 by reducing the second voltage V5, and terminates the second current I6 to protect the first P-type transistor Q2 in response to the inverse of the fifth signal S11 by increasing the second voltage V7.

The first resistor R1 has a first terminal P1 coupled to the drain of the second N-type transistor M3 and a second terminal P2 coupled to a ground. The second N-type transistor M3 has a source outputting a third current I7 which flows through the resistor R1 so as to cause the first resistor R1 to have a voltage drop being equal to the third voltage V6. The second resistor R2 has a third terminal P3 coupled to the source of the second P-type transistor Q3 and a second terminal P4 coupled to a power source. The source of the second P-type transistor Q3 outputs a fourth current I8 which flows through the second resistor R2 so as to cause the fourth voltage V8 being equal to the voltage drop of R2 subtracted from the voltage VDD of the power source.

Figure 5A:
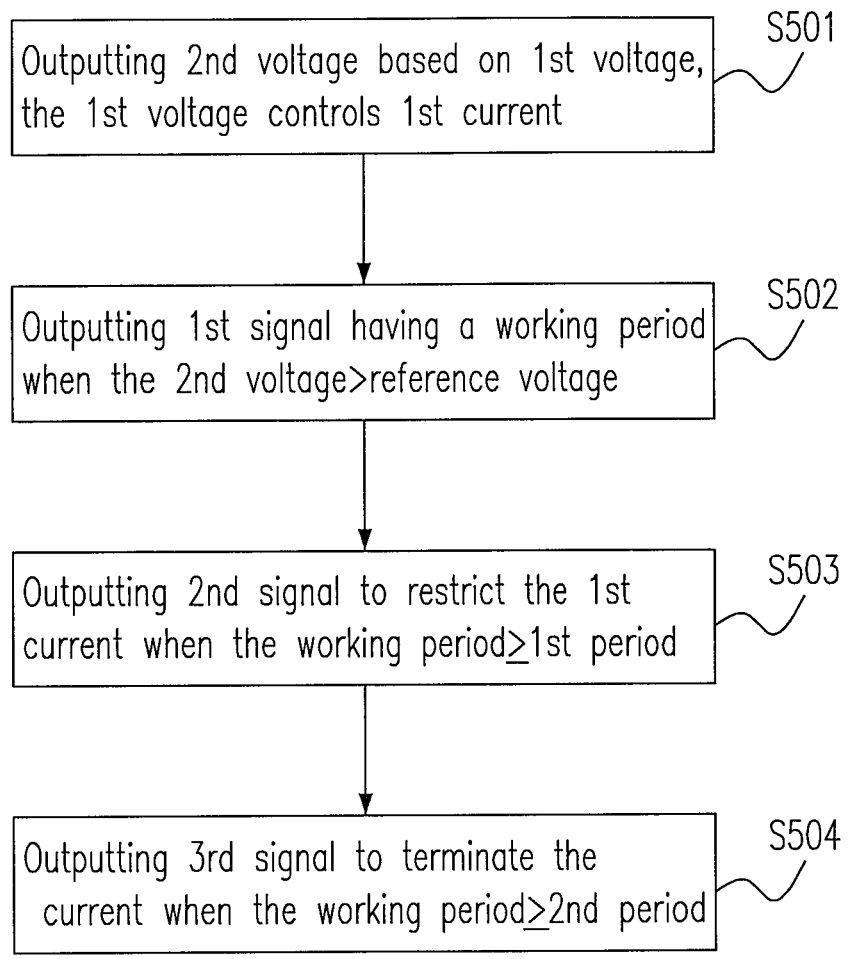
FIGS. 5A and 5B are schematic diagrams showing operational flows of methods of the protection circuit according to the present invention.

Please refer to FIG. 5A which illustrates a flow chart of the operation method of the protection circuit according to the present invention. As shown in FIG. 5A, the method comprises: outputting a second voltage based on a first voltage controlling a first current (step S501); outputting a first signal when the second voltage is larger than a reference voltage, wherein the first signal has a working period (step S502); outputting a second signal to restrict the first current when the working period is longer than or equal to a first period (step S503); and outputting a third signal to terminate the first current when the working period is longer than or equal to a second period (step S504).

Figure 5B:
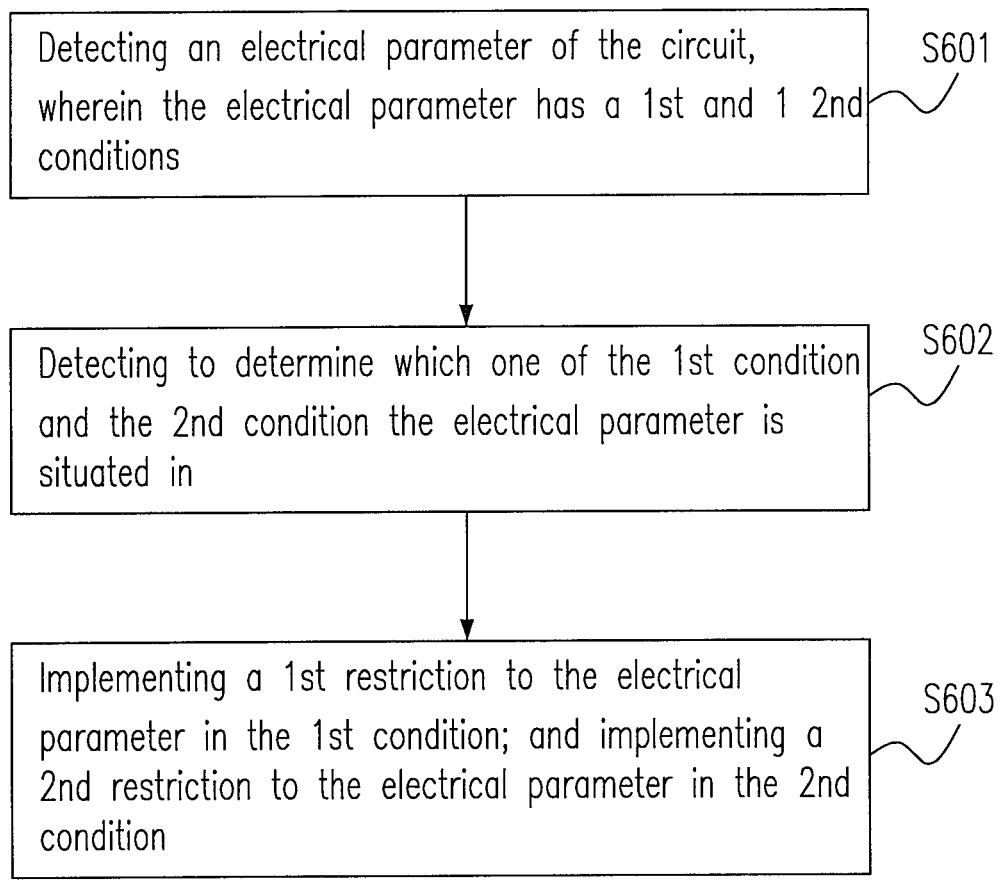

Please refer to FIG. 5B which illustrates a flow chart of the other operation method of the protection circuit according to the present invention. As shown in FIG. 5B, the method comprises: detecting an electrical parameter of the circuit, wherein the electrical parameter has a first and a second conditions (step S601); detecting the electrical parameter to determine which one of the first condition and the second condition the electrical parameter is situated in (step S602); implementing a first restriction to the electrical parameter in the first condition (step S603); and implementing a second restriction to the electrical parameter in the second condition (step S604).

Embodiments

1. A protection circuit, comprising:
    an output stage circuit generating a first current; and
    a feedback unit, wherein:
    under a first condition that the first current is one of currents larger than and equal to a rated current and the first condition remains for a first period, the feedback unit controls the output stage circuit to restrict the first current; and
    under a second condition that the first current is one of currents larger than and equal to a restriction current and the second condition remains for a second period, the feedback unit controls the output stage circuit to terminate the first current.
2. The protection circuit of embodiment 1, wherein the second period is longer than the first period, and the restriction current is lower than the rated current.
3. The protection circuit of embodiment 1, wherein the output stage circuit comprises an output stage circuit of one of a switching power source and an operational amplifier.
4. The protection circuit of embodiment 1, wherein the output stage circuit comprises a first N-type transistor and a first P-type transistor, the first N-type transistor has a drain coupled to that of the first P-type transistor, and the first N-type transistor has a gate receiving a first voltage to adjust the first current outputted from the drain of the first N-type transistor.
5. The protection circuit of embodiment 4, wherein the feedback unit comprises:
    a current measurement unit including a second N-type transistor and a resistor, wherein the second N-type transistor has a drain coupled to that of the first N-type transistor, the second N-type transistor has a gate receiving the first voltage, and the current measurement unit outputs a second voltage in response to the first voltage;
    an operational amplifying unit including a first input terminal, a second input terminal, and a first output terminal, wherein the first and the second output terminals receive the second voltage and a first reference voltage respectively, the operational amplifying unit outputs a first signal from the first output terminal in response to the second voltage and the first reference voltage, the first signal includes a difference signal obtained by subtracting the first reference voltage from the second voltage, the first signal is a positive saturation signal when the difference signal is positive, and the first signal is a negative saturation signal when the difference signal is negative;
    a first timer unit receiving the first signal, wherein the first signal has a working period, and the first timer unit transmits a second signal when the working period is one of periods longer than and equal to the first period;
    a restriction unit including an amplifier, a third N-type transistor and a fourth N-type transistor, and restricting the first current by reducing the first voltage in response to the second signal;

a second timer unit having an output terminal, receiving the first signal, and transmitting a third signal when the working period is one of periods longer than and equal to the second period; and a termination unit including a fifth N-type transistor having a gate coupled to the output terminal of the second timer unit to receive the third signal, and terminating the first current to protect the first N-type transistor in response to the third signal by reducing the first voltage.

6. The protection circuit of embodiment 5, wherein:

the resistor has a first terminal and a second terminal, the second terminal is coupled to a ground, the first terminal is coupled to the drain of the second N-type transistor, the second N-type transistor has a source outputting a second current flows through the resistor so as to cause the resistor to have a voltage drop equal to the second voltage;

the third N-type transistor has a source;

the amplifier has a positive input terminal, a negative input terminal and a second output terminal, the third N-type transistor has a drain coupled to the positive input terminal, the negative input terminal receives a second reference voltage, and the third N-type transistor has a gate coupled to the second output terminal;

the fourth N-type transistor has a drain coupled to the source of the third N-type transistor;

the first timer unit has an output terminal;

the fourth N-type transistor has a gate coupled to the output terminal of the first timer unit to receive the second signal;

the fifth N-type transistor has a drain; and the protection circuit further comprises an input stage circuit having a third output terminal and a fourth output terminal, wherein the first P-type transistor has a gate coupled to the third output terminal, the fourth output terminal is coupled to the drain of the fifth N-type transistor, the positive input terminal, the drain of the third N-type transistor, and the gate of the first N-type transistor.

7. The protection circuit of embodiment 1, wherein:

the output stage circuit includes a first N-type transistor and a first P-type transistor, the first N-type transistor has a drain coupled to that of the first P-type transistor, and the first P-type transistor has a gate receiving a first voltage to adjust the first current outputted from the drain of the first P-type transistor;

the output stage circuit further includes an output stage circuit of one of a switching power source and an operational amplifier; and the feedback unit comprises:

a current measurement unit including a second P-type transistor and a resistor, wherein the second P-type transistor has a drain coupled to that of the first P-type transistor, the second P-type transistor has a gate receiving the first voltage, and the current measurement unit outputs a second voltage in response to the first voltage;

an operational amplifying unit including a first input terminal, a second input terminal and a first output terminal, wherein the first and the second input terminals receive the second voltage and a first reference voltage respectively, the operational amplifying unit outputs a first signal from the first output terminal in response to the second voltage and the first reference voltage, the first signal includes a difference signal obtained by subtracting the second voltage from the first reference voltage, the first signal is a positive saturation signal when the difference signal is positive, and the first signal is a negative saturation signal when the difference signal is negative;

a first timer unit receiving the first signal, wherein the first signal has a working period, and the first timer unit transmits a second signal when the working period is one of periods longer than and equal to the first period;

a first inverter generating an inverse signal of the second signal in response to the second signal;

a restriction unit including an amplifier, a third P-type transistor and a fourth P-type transistor, and restricting the first current in response to the inverse signal of the second signal by increasing the first voltage;

a second timer unit receiving the first signal, and transmitting a third signal when the working period is one of periods longer than and equal to a second period;

a second inverter generating an inverse signal of the third signal in response to the third signal; and a termination unit including a fifth P-type transistor, and terminating the first current to protect the first P-type transistor in response to the third signal by increasing the first voltage.

8. The protection circuit of embodiment 7, wherein:

the feedback unit further comprises an inspection unit including the current measurement unit and the operational amplifying unit;

the second P-type transistor has a source;

the resistor has a first terminal and a second terminal, the second terminal is coupled to a power source having a voltage, the first terminal is coupled to the source of the second P-type transistor, the resistor has a voltage drop and a second current flowing therethrough so as to result in the second voltage equal to a voltage obtaining by subtracting the voltage drop of the resistor from the voltage of the power source;

the amplifier has a positive input terminal, a negative input terminal and a second output terminal, the third P-type transistor has a drain coupled to the negative input terminal, the positive input terminal receives a second reference voltage, and the third P-type transistor has a gate coupled to the second output terminal;

the fourth P-type transistor has a drain;

the third P-type transistor has a source coupled to the drain of the fourth P-type transistor;

The first inverter includes an output terminal;

the fourth P-type transistor has a gate coupled to the output terminal of the first inverter to receive the second signal; and the protection circuit further comprises an input stage circuit having a third output terminal and a fourth output terminal, wherein the first N-type transistor has a gate; the third output terminal is coupled to the gate of the first N-type transistor, the fifth P-type transistor has a drain, the fourth output terminal is coupled to the drain of the fifth P-type transistor, the negative input terminal, the drain of the third P-type transistor, and the gate of the first P-type transistor.

9. A protection circuit having an electrical parameter, comprising:

a control unit providing a first control and a second control to the electrical parameter in response to a first condition and a second condition of the electrical parameter, respectively.

10. The protection circuit of embodiment 9, wherein:

the electrical parameter includes one of a voltage and a first current;

the first control is a restriction;

the second control is a shut-off;

the first condition is a first status that the first current is one of currents larger than and equal to a rated current and the first status remains for a first period; and the second condition is a second status that the first current is one of currents larger than and equal to a restriction current and the second status remains for a second period, wherein the second period is longer than the first period, and the restriction current is lower than the rated current.

11. The protection circuit of embodiment 10, wherein the protection circuit further comprises an output stage circuit being an output stage circuit of one of a switching power source and an operational amplifier, the output stage circuit includes a first N-type transistor and a first P-type transistor, the first N-type transistor has a drain coupled to that of the first P-type transistor, and the first N-type transistor has a gate receiving the first voltage to adjust the first current outputted from the drain of the first N-type transistor.

12. The protection circuit of embodiment 11, wherein the control unit comprising:

a current measurement unit including a second N-type transistor and a resistor, wherein the second N-type transistor has a drain coupled to that of the first N-type transistor, the second N-type transistor has a gate receiving the first voltage, and the current measurement unit outputs a second voltage in response to the first voltage;

an operational amplifying unit including a first input terminal, a second input terminal, and a first output terminal, wherein the first and the second output terminals receive the second voltage and a first reference voltage respectively, the operational amplifying unit outputs a first signal from the first output terminal in response to the second voltage and the first reference voltage, the first signal includes a difference signal obtained by subtracting the first reference voltage from the second voltage, the first signal is a positive saturation signal when the difference signal is positive, and the first signal is a negative saturation signal when the difference signal is negative;

a first timer unit receiving the first signal, wherein the first signal has a working period, and the first timer unit transmits a second signal when the working period is one of periods longer than and equal to the first period;

a restriction unit including an amplifier, a third N-type transistor and a fourth N-type transistor, and restricting the first current by reducing the first voltage in response to the second signal;

a second timer unit having an output terminal, receiving the first signal, and transmitting a third signal when the working period is one of periods longer than and equal to the second period; and a termination unit including a fifth N-type transistor having a gate coupled to the output terminal of the second timer unit to receive the third signal, and terminating the first current to protect the first N-type transistor in response to the third signal by reducing the first voltage.

13. The protection circuit of embodiment 11, wherein:

the resistor has a first terminal and a second terminal, the second terminal is coupled to a ground, the first terminal is coupled to the drain of the second N-type transistor, the second N-type transistor has a source outputting a second current flows through the resistor so as to cause the resistor to have a voltage drop equal to the second voltage;

the third N-type transistor has a source;

the amplifier has a positive input terminal, a negative input terminal and a second output terminal, the third N-type transistor has a drain coupled to the positive input terminal, the negative input terminal receives a second reference voltage, and the third N-type transistor has a gate coupled to the second output terminal;

the fourth N-type transistor has a drain coupled to the source of the third N-type transistor;

the first timer unit has an output terminal;

the fourth N-type transistor has a gate coupled to the output terminal of the first timer unit to receive the second signal;

the fifth N-type transistor has a drain; and the protection circuit further comprises an input stage circuit having a third output terminal and a fourth output terminal, wherein the first P-type transistor has a gate coupled to the third output terminal, the fourth output terminal is coupled to the drain of the fifth N-type transistor, the positive input terminal, the drain of the third N-type transistor, and the gate of the first N-type transistor.

14. The protection circuit of embodiment 9, further comprising an output stage circuit, wherein:

the control unit comprises:

the output stage circuit includes a first N-type transistor and a first P-type transistor, the first N-type transistor has a drain coupled to that of the first P-type transistor, and the first P-type transistor has a gate receiving a first voltage to adjust the first current outputted from the drain of the first P-type transistor;

the output stage circuit further includes an output stage circuit of one of a switching power source and an operational amplifier; and the feedback unit comprises:

a current measurement unit including a second P-type transistor and a resistor, wherein the second P-type transistor has a drain coupled to that of the first P-type transistor, the second P-type transistor has a gate receiving the first voltage, and the current measurement unit outputs a second voltage in response to the first voltage;

an operational amplifying unit including a first input terminal, a second input terminal and a first output terminal, wherein the first and the second input terminals receive the second voltage and a first reference voltage respectively, the operational amplifying unit outputs a first signal from the first output terminal in response to the second voltage and the first reference voltage, the first signal includes a difference signal obtained by subtracting the second voltage from the first reference voltage, the first signal is a positive saturation signal when the difference signal is positive, and the first signal is a negative saturation signal when the difference signal is negative;

a first timer unit receiving the first signal, wherein the first signal has a working period, and the first timer unit transmits a second signal when the working period is one of periods longer than and equal to the first period;

a first inverter generating an inverse signal of the second signal in response to the second signal;

a restriction unit including an amplifier, a third P-type transistor and a fourth P-type transistor, and restricting the first current in response to the inverse signal of the second signal by increasing the first voltage;

a second timer unit receiving the first signal, and transmitting a third signal when the working period is one of periods longer than and equal to a second period;

a second inverter generating an inverse signal of the third signal in response to the third signal; and a termination unit including a fifth P-type transistor, and terminating the first current to protect the first P-type transistor in response to the third signal by increasing the first voltage.

15. The protection circuit of embodiment 9, wherein:
the control unit further comprises an inspection unit including the current measurement unit and the operational amplifying unit;
the feedback unit further comprises an inspection unit including the current measurement unit and the operational amplifying unit;
the second P-type transistor has a source;
the resistor has a first terminal and a second terminal, the second terminal is coupled to a power source having a voltage, the first terminal is coupled to the source of the second P-type transistor, the resistor has a voltage drop and a second current flowing therethrough so as to result in the second voltage equal to a voltage obtaining by subtracting the voltage drop of the resistor from the voltage of the power source;
the amplifier has a positive input terminal, a negative input terminal and a second output terminal, the third P-type transistor has a drain coupled to the negative input terminal, the positive terminal receives a second reference voltage, and the third P-type transistor has a gate coupled to the second output terminal;
the fourth P-type transistor has a drain;
the third P-type transistor has a source coupled to the drain of the fourth P-type transistor;
The first inverter includes an output terminal;
the fourth P-type transistor has a gate coupled to the output terminal of the first inverter to receive the second signal; and
the protection circuit further comprises an input stage circuit having a third output terminal and a fourth output terminal, wherein the first N-type transistor has a gate; the third output terminal is coupled to the gate of the first N-type transistor, the fifth P-type transistor has a drain, the fourth output terminal is coupled to the drain of the fifth P-type transistor, the negative input terminal, the drain of the third P-type transistor, and the gate of the first P-type transistor.

16. The protection circuit of embodiment 9, wherein:
the electrical parameter includes one selected from a group consisting of a voltage, a first current and a second current;
the first control is a restriction;
the second control is a shut-off;
the first condition is a first status that either one of the first current and the second current is one of currents larger than and equal to a rated current and the first status remains for a first period;
the second condition is a second status that either one of the first current and the second current is one of currents larger than and equal to a restriction current and the second status remains for a second period, wherein the second period is longer than the first period, and the restriction current is lower than the rated current; and
the protection circuit further comprises an output stage circuit being an output stage circuit of one of a switching power source and an operational amplifier, the output stage circuit includes a first N-type transistor and a first P-type transistor, the first N-type transistor has a drain coupled to that of the first P-type transistor, the first N-type transistor has a gate receiving a first voltage to adjust the first current outputted from the drain of the first N-type transistor, and the first P-type transistor has a gate receiving a second voltage to adjust the second current outputted from the drain of the first P-type transistor.

17. An method of operating a protection circuit, comprising steps of:
outputting a second voltage based on a first voltage controlling a first current;
outputting a first signal when the second voltage is larger than a reference voltage, wherein the first signal has a working period;
outputting a second signal to restrict the first current when the working period is one of periods longer than and equal to a first period; and
outputting a third signal to terminate the first current when the working period is one of periods longer than and equal to a second period.

18. The method of embodiment 17, further comprising steps of:
outputting a second current in response to the first voltage; and
outputting the second voltage in response to the second current.

19. A method for protecting a circuit, comprising steps of:
detecting an electrical parameter of the circuit, wherein the electrical parameter has a first and a second conditions;
detecting the electrical parameter to determine which one of the first condition and the second condition the electrical parameter is situated in;
implementing a first restriction to the electrical parameter in the first condition; and implementing a second restriction to the electrical parameter in the second condition.

20. The method of embodiment 19, wherein:
the electrical parameter includes one of a voltage and a current; and
the second restriction includes terminating the electrical parameter.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:

1. A protection circuit, comprising:
an output stage circuit generating a first current; and
a feedback unit, wherein:
under a first condition that the first current is larger than or equal to a rated current and the first condition remains for a first period, the feedback unit controls the output stage circuit to restrict the first current; and
under a second condition that the first current remains larger than or equal to the rated current after the first current is restricted and the second condition remains for a second period, the feedback unit controls the output stage circuit to terminate the first current, wherein the feedback unit comprises:
a measurement unit including a first output terminal to output a first signal therefrom in response to the first current;
a first timer unit directly coupled to the first output terminal to receive the first output signal and transmit a second signal to restrict the first current; and a second timer unit directly coupled to the first output terminal to receive the first output signal and transmit a third signal to terminate the first current.

2. A protection circuit as claimed in claim 1, wherein the second period is longer than the first period.

3. A protection circuit as claimed in claim 1, wherein the output stage circuit comprises an output stage circuit of one of a switching power source and an operational amplifier.

4. A protection circuit as claimed in claim 1, wherein the output stage circuit comprises a first N-type transistor and a first P-type transistor, the first N-type transistor has a drain coupled to that of the first P-type transistor, and the first N-type transistor has a gate receiving a first voltage to adjust the first current outputted from the drain of the first N-type transistor.

5. A protection circuit as claimed in claim 4, wherein the feedback unit comprises:
a current measurement unit including a second N-type transistor and a resistor, wherein the second N-type transistor has a drain coupled to that of the first N-type transistor, the second N-type transistor has a gate receiving the first voltage, and the current measurement unit outputs a second voltage in response to the first voltage;
an operational amplifying unit including a first input terminal, a second input terminal, and the first output terminal, wherein the first and the second output terminals receive the second voltage and a first reference voltage respectively, the operational amplifying unit outputs the first signal from the first output terminal in response to the second voltage and the first reference voltage, the first signal includes a difference signal obtained by subtracting the first reference voltage from the second voltage, the first signal is a positive saturation signal when the difference signal is positive, and the first signal is a negative saturation signal when the difference signal is negative;
a restriction unit including the amplifier, the third N-type transistor and the fourth N-type transistor, and restricting the first current by reducing the first voltage in response to the second signal; and
a termination unit including a fifth N-type transistor having a gate coupled to the output terminal of the second timer unit to receive the third signal, and terminating the first current to protect the first N-type transistor in response to the third signal by reducing the first voltage, and wherein:
the first timer unit receiving the first signal, wherein the first signal has a working period, and the first timer unit transmits the second signal when the working period is one of periods longer than and equal to the first period; and
the second timer unit having an output terminal, receiving the first signal, and transmitting the third signal when the working period is one of periods longer than and equal to the second period.

6. A protection circuit as claimed in claim 5, wherein:
the resistor has a first terminal and a second terminal, the second terminal is coupled to a ground, the first terminal is coupled to the drain of the second N-type transistor, the second N-type transistor has a source outputting a second current flows through the resistor so as to cause the resistor to have a voltage drop equal to the second voltage;
the third N-type transistor has a source;
the amplifier has a positive input terminal, a negative input terminal and a second output terminal, the third N-type transistor has a drain coupled to the positive input terminal, the negative input terminal receives a second reference voltage, and the third N-type transistor has a gate coupled to the second output terminal;
the fourth N-type transistor has a drain coupled to the source of the third N-type transistor;
the first timer unit has an output terminal;
the fourth N-type transistor has a gate coupled to the output terminal of the first timer unit to receive the second signal;
the fifth N-type transistor has a drain; and
the protection circuit further comprises an input stage circuit having a third output terminal and a fourth output terminal, wherein the first P-type transistor has a gate coupled to the third output terminal, the fourth output terminal is coupled to the drain of the fifth N-type transistor, the positive input terminal, the drain of the third N-type transistor, and the gate of the first N-type transistor.

7. A protection circuit as claimed in claim 1, wherein:
the output stage circuit includes a first N-type transistor and a first P-type transistor, the first N-type transistor has a drain coupled to that of the first P-type transistor, and the first P-type transistor has a gate receiving a first voltage to adjust the first current outputted from the drain of the first P-type transistor;
the output stage circuit being an output stage circuit of one of a switching power source and an operational amplifier; and
the feedback unit comprises:
a current measurement unit including a second P-type transistor and a resistor, wherein the second P-type transistor has a drain coupled to that of the first P-type transistor, the second P-type transistor has a gate receiving the first voltage, and the current measurement unit outputs a second voltage in response to the first voltage;
an operational amplifying unit including a first input terminal, a second input terminal and a first output terminal, wherein the first and the second input terminals receive the second voltage and a first reference voltage respectively, the operational amplifying unit outputs a first signal from the first output terminal in response to the second voltage and the first reference voltage, the first signal includes a difference signal obtained by subtracting the second voltage from the first reference voltage, the first signal is a positive saturation signal when the difference signal is positive, and the first signal is a negative saturation signal when the difference signal is negative;
a first timer unit receiving the first signal, wherein the first signal has a working period, and the first timer unit transmits a second signal when the working period is one of periods longer than and equal to the first period;
a first inverter generating an inverse signal of the second signal in response to the second signal;
a restriction unit including an amplifier, a third P-type transistor and a fourth P-type transistor, and restricting the first current in response to the inverse signal of the second signal by increasing the first voltage;
a second timer unit receiving the first signal, and transmitting a third signal when the working period is one of periods longer than and equal to a second period;
a second inverter generating an inverse signal of the third signal in response to the third signal; and a termination unit including a fifth P-type transistor, and terminating the first current to protect the first P-type transistor in response to the third signal by increasing the first voltage.

8. A protection circuit as claimed in claim 7, wherein:
the feedback unit further comprises an inspection unit including the current measurement unit and the operational amplifying unit;
the second P-type transistor has a source;
the resistor has a first terminal and a second terminal, the second terminal is coupled to a power source having a voltage, the first terminal is coupled to the source of the second P-type transistor, the resistor has a voltage drop and a second current flowing therethrough so as to result in the second voltage equal to a voltage obtaining by subtracting the voltage drop of the resistor from the voltage of the power source;
the amplifier has a positive input terminal, a negative input terminal and a second output terminal, the third P-type transistor has a drain coupled to the negative input terminal, the positive input terminal receives a second reference voltage, and the third P-type transistor has a gate coupled to the second output terminal;
the fourth P-type transistor has a drain;
the third P-type transistor has a source coupled to the drain of the fourth P-type transistor;
The first inverter includes an output terminal;
the fourth P-type transistor has a gate coupled to the output terminal of the first inverter to receive the second signal; and
the protection circuit further comprises an input stage circuit having a third output terminal and a fourth output terminal, wherein the first N-type transistor has a gate; the third output terminal is coupled to the gate of the first N-type transistor, the fifth P-type transistor has a drain, the fourth output terminal is coupled to the drain of the fifth P-type transistor, the negative input terminal, the drain of the third P-type transistor, and the gate of the first P-type transistor.

9. A protection circuit having an electrical parameter, comprising:
a control unit providing a first control and a second control to the electrical parameter in response to a first condition and a second condition of the electrical parameter, respectively; and
a restriction unit including:
a first controlled transistor;
an amplifier having a reference input terminal, a control output terminal and a variable input terminal that has its voltage adjusted in response to the first control and the second control, wherein the first controlled transistor has a source, a drain coupled to the variable input terminal and a gate coupled to the control output terminal, and the reference input terminal receives a predetermined reference voltage; and
a second controlled transistor having:
a drain coupled to the source of the first controlled transistor; and
a gate receiving the first control.

10. A protection circuit as claimed in claim 9, wherein:
the electrical parameter includes one of a voltage and a first current;
the first control is a restriction;
the second control is a shut-off;
the first condition is a first status that the first current is larger than or equal to a rated current and the first status remains for a first period; and the second condition is a second status that the first current is larger than or equal to the rated current and the second status remains for a second period, wherein the second period is longer than the first period.

11. A protection circuit as claimed in claim 10, wherein the protection circuit further comprises an output stage circuit being an output stage circuit of one of a switching power source and an operational amplifier, the output stage circuit includes a first N-type transistor and a first P-type transistor, the first N-type transistor has a drain coupled to that of the first P-type transistor, and the first N-type transistor has a gate receiving the first voltage to adjust the first current outputted from the drain of the first N-type transistor.

12. A protection circuit as claimed in claim 11, wherein the control unit comprises:
a current measurement unit including a second N-type transistor and a resistor, wherein the second N-type transistor has a drain coupled to that of the first N-type transistor, the second N-type transistor has a gate receiving the first voltage, and the current measurement unit outputs a second voltage in response to the first voltage;
an operational amplifying unit including a first input terminal, a second input terminal, and a first output terminal, wherein the first and the second output terminals receive the second voltage and a first reference voltage respectively, the operational amplifying unit outputs a first signal from the first output terminal in response to the second voltage and the first reference voltage, the first signal includes a difference signal obtained by subtracting the first reference voltage from the second voltage, the first signal is a positive saturation signal when the difference signal is positive, and the first signal is a negative saturation signal when the difference signal is negative;
a first timer unit receiving the first signal, wherein the first signal has a working period, and the first timer unit transmits a second signal when the working period is one of periods longer than and equal to the first period;
a second timer unit having an output terminal, receiving the first signal, and transmitting a third signal when the working period is one of periods longer than and equal to the second period; and
a termination unit including a fifth N-type transistor having a gate coupled to the output terminal of the second timer unit to receive the third signal, and terminating the first current to protect the first N-type transistor in response to the third signal by reducing the first voltage, wherein the restriction unit includes the amplifier, a third N-type transistor being the first controlled transistor and a fourth N-type transistor being the second controlled transistor, and restricts the first current by reducing the first voltage in response to the second signal.

13. A protection circuit as claimed in claim 12, wherein:
the resistor has a first terminal and a second terminal, the second terminal is coupled to a ground, the first terminal is coupled to the drain of the second N-type transistor, the second N-type transistor has a source outputting a second current flowing through the resistor so as to cause the resistor to have a voltage drop equal to the second voltage;
the amplifier has a positive input terminal being the variable input terminal, a negative input terminal being the reference input terminal, and a second output terminal being the control output terminal, wherein the negative input terminal receives a second reference voltage being the predetermined reference voltage;
the first timer unit has an output terminal;

the fourth N-type transistor has a gate coupled to the output terminal of the first timer unit to receive the second signal;
the fifth N-type transistor has a drain; and
the protection circuit further comprises an input stage circuit having a third output terminal and a fourth output terminal, wherein the first P-type transistor has a gate coupled to the third output terminal, the fourth output terminal is coupled to the drain of the fifth N-type transistor, the positive input terminal, the drain of the third N-type transistor, and the gate of the first N-type transistor.

14. A protection circuit as claimed in claim 9, further comprising an output stage circuit, wherein:
the output stage circuit includes a first N-type transistor and a first P-type transistor, the first N-type transistor has a drain coupled to that of the first P-type transistor, and the first P-type transistor has a gate receiving a first voltage to adjust the first current outputted from the drain of the first P-type transistor;
the output stage circuit being an output stage circuit of one of a switching power source and an operational amplifier; and
the control unit comprises the output stage circuit and a feedback unit, wherein the feedback unit comprises:
a current measurement unit including a second P-type transistor and a resistor, wherein the second P-type transistor has a drain coupled to that of the first P-type transistor, the second P-type transistor has a gate receiving the first voltage, and the current measurement unit outputs a second voltage in response to the first voltage;
an operational amplifying unit including a first input terminal, a second input terminal and a first output terminal, wherein the first and the second input terminals receive the second voltage and a first reference voltage respectively, the operational amplifying unit outputs a first signal from the first output terminal in response to the second voltage and the first reference voltage, the first signal includes a difference signal obtained by subtracting the second voltage from the first reference voltage, the first signal is a positive saturation signal when the difference signal is positive, and the first signal is a negative saturation signal when the difference signal is negative;
a first timer unit receiving the first signal, wherein the first signal has a working period, and the first timer unit transmits a second signal when the working period is one of periods longer than and equal to the first period;
a first inverter generating an inverse signal of the second signal in response to the second signal;
a restriction unit including the amplifier, a third P-type transistor being the first controlled transistor, and a fourth P-type transistor being the second controlled transistor, and restricting the first current in response to the inverse signal of the second signal by increasing the first voltage;
a second timer unit receiving the first signal, and transmitting a third signal when the working period is one of periods longer than and equal to a second period;
a second inverter generating an inverse signal of the third signal in response to the third signal; and
a termination unit including a fifth P-type transistor, and terminating the first current to protect the first P-type transistor in response to the inverse signal of the third signal by increasing the first voltage.

15. A protection circuit as claimed in claim 14, wherein:
the control unit further comprises an inspection unit including the current measurement unit and the operational amplifying unit;
the feedback unit further comprises an inspection unit including the current measurement unit and the operational amplifying unit;
the second P-type transistor has a source;
the resistor has a first terminal and a second terminal, the second terminal is coupled to a power source having a voltage, the first terminal is coupled to the source of the second P-type transistor, the resistor has a voltage drop and a second current flowing therethrough so as to result in the second voltage equal to a voltage obtaining by subtracting the voltage drop of the resistor from the voltage of the power source;
the amplifier has a positive input terminal being the reference input terminal, a negative input terminal being the control input terminal, and a second output terminal being the control output terminal, wherein the positive input terminal receives a second reference voltage being the predetermined reference voltage
The first inverter includes an output terminal;
the fourth P-type transistor has a gate coupled to the output terminal of the first inverter to receive the second signal; and
the protection circuit further comprises an input stage circuit having a third output terminal and a fourth output terminal, wherein the first N-type transistor has a gate; the third output terminal is coupled to the gate of the first N-type transistor, the fifth P-type transistor has a drain, the fourth output terminal is coupled to the drain of the fifth P-type transistor, the negative input terminal, the drain of the third P-type transistor, and the gate of the first P-type transistor.

16. A protection circuit as claimed in claim 9, wherein:
the electrical parameter includes one selected from a group consisting of a voltage, a first current and a second current;
the first control is a restriction;
the second control is a shut-off;
the first condition is a first status that either one of the first current and the second current is one of currents larger than or equal to a rated current and the first status remains for a first period;
the second condition is a second status that either one of the first current and the second current is one of currents larger than or equal to the rated current and the second status remains for a second period, wherein the second period is longer than the first period; and
the protection circuit further comprises an output stage circuit being an output stage circuit of one of a switching power source and an operational amplifier, the output stage circuit includes a first N-type transistor and a first P-type transistor, the first N-type transistor has a drain coupled to that of the first P-type transistor, the first N-type transistor has a gate receiving a first voltage to adjust the first current outputted from the drain of the first N-type transistor, and the first P-type transistor has a gate receiving a second voltage to adjust the second current outputted from the drain of the first P-type transistor.

17. A method of operating a protection circuit, comprising steps of:
outputting a second voltage based on a first voltage controlling a first current;

outputting a first signal when the second voltage is larger than a first reference voltage, wherein the first signal has a working period;

outputting a second signal when the working period is one of periods longer than or equal to a first period;

receiving the second signal and lowering the first voltage based on the first voltage and a second reference voltage to restrict the first current; and outputting a third signal to terminate the first current when the working period is one of periods longer than or equal to a second period.

18. A method as claimed in claim 17, further comprising steps of:

outputting a second current in response to the first voltage; and outputting the second voltage in response to the second current.

19. A method for protecting a circuit, comprising steps of:

detecting a first electrical parameter of the circuit, wherein the first electrical parameter has a first and a second condition;

responding to a second electrical parameter of the circuit and a first reference voltage for outputting a first signal, wherein the first signal has a working period;

keeping the first electrical parameter under the first condition when the working period remains for a first period;

implementing a first restriction to the first electrical parameter in the first condition; and implementing a second restriction to the first electrical parameter in the second condition during the working period, wherein the first electrical parameter is under the second condition when the working period remains for a second period.

20. A method as claimed in claim 19, wherein:

the first electrical parameter is an output current and the second electrical parameter is a feedback voltage; and the second restriction includes terminating the electrical parameter.

* * * * *